United States Patent [19]
Chandler

[11] Patent Number: 5,676,383
[45] Date of Patent: Oct. 14, 1997

[54] HYDRODYNAMIC LOW-TORQUE LUBRICANT SEAL WITH PUMPING PROJECTIONS

[75] Inventor: Jon Chandler, Powell, Ohio

[73] Assignee: Federal-Mogul Corporation, Southfield, Mich.

[21] Appl. No.: 711,619

[22] Filed: Sep. 10, 1996

[51] Int. Cl.⁶ .................................................. F16J 15/32
[52] U.S. Cl. ...................... 277/134; 277/152; 277/53; 277/67; 384/484; 384/486; 384/478
[58] Field of Search .................................. 277/134, 152, 277/53, 67; 384/484, 486, 478

[56] References Cited

U.S. PATENT DOCUMENTS

| | | | |
|---|---|---|---|
| 3,214,179 | 10/1965 | Dega | 277/134 |
| 3,497,225 | 2/1970 | Workman | 277/134 |
| 3,790,180 | 2/1974 | Heyn et al. | 277/134 |
| 3,807,743 | 4/1974 | Burke | 277/134 |
| 3,895,814 | 7/1975 | Kupfert | 277/134 |
| 3,921,987 | 11/1975 | Johnston | 277/134 |
| 4,399,998 | 8/1983 | Otto | 277/134 |
| 4,522,411 | 6/1985 | Burgan | 277/134 |
| 4,770,424 | 9/1988 | Otto | 277/134 |
| 4,770,548 | 9/1988 | Otto | 384/478 |
| 4,799,808 | 1/1989 | Otto | 384/481 |
| 4,822,058 | 4/1989 | Butler et al. | 277/152 |
| 5,017,025 | 5/1991 | Williams | 384/584 |
| 5,511,886 | 4/1996 | Sink | 277/134 |

FOREIGN PATENT DOCUMENTS

| | | | |
|---|---|---|---|
| 1954972 | 1/1969 | Germany | 277/134 |
| 2108596 | 5/1983 | United Kingdom | 277/134 |

Primary Examiner—Diego F. F. Gutierrez
Assistant Examiner—Christina Annick
Attorney, Agent, or Firm—Lawrence J. Shurupoff

[57] ABSTRACT

An annular elastomeric sealing member includes a static sealing lip and a series of projections facing the lubricant. Each projection has a convex front surface that provides two oppositely facing pumping faces and an angled rear surface that intersects the front surface at an acute angle so as to form a sharp leading edge. The sharp leading edge on each projection has a relatively small radial clearance with respect to the cylindrical surface that is to be sealed. This small clearance enables the projections to exert pumping forces on lubricant proximate to the cylindrical surface.

15 Claims, 2 Drawing Sheets

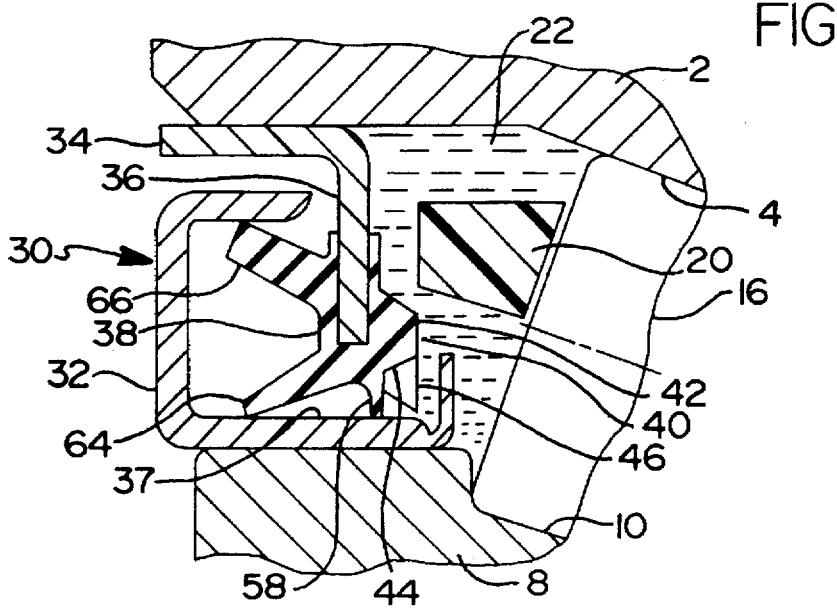
FIG 1
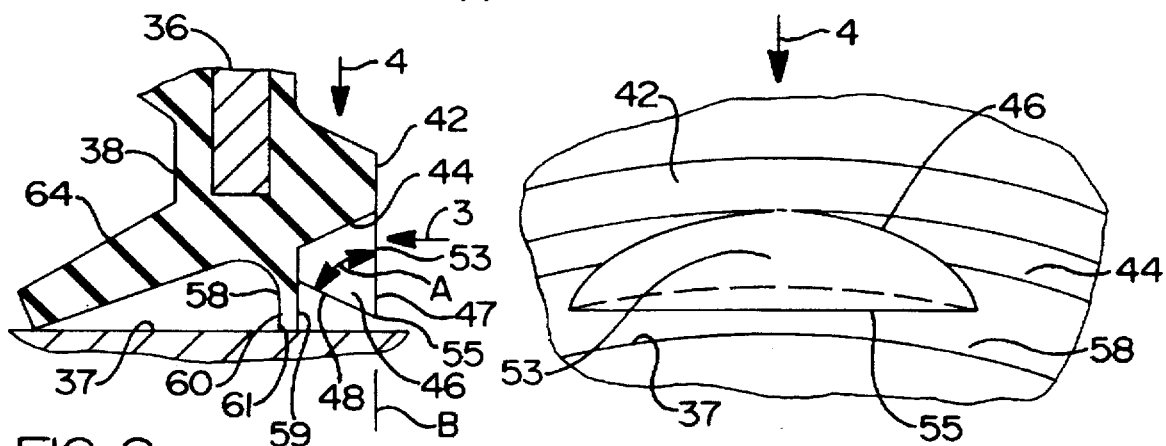
FIG 2
FIG 3
FIG 4
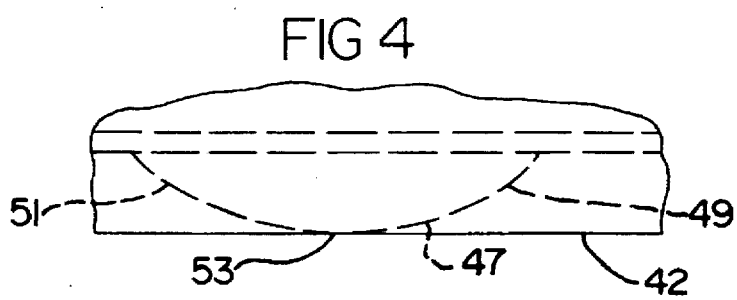
FIG 5
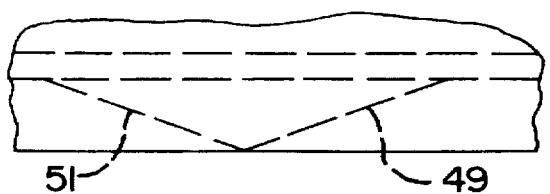

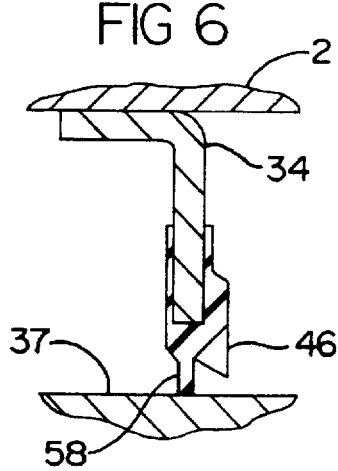
FIG 6
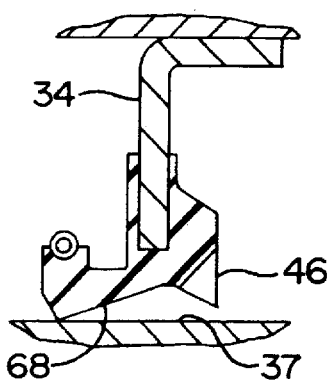
FIG 7
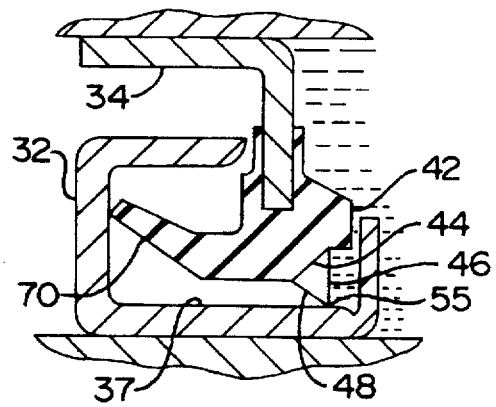
FIG 8
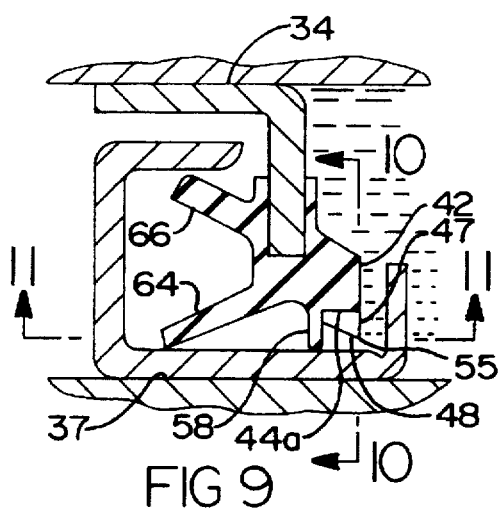
FIG 9
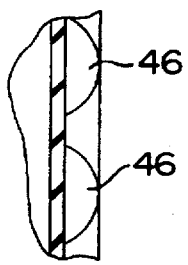
FIG 10
FIG 11
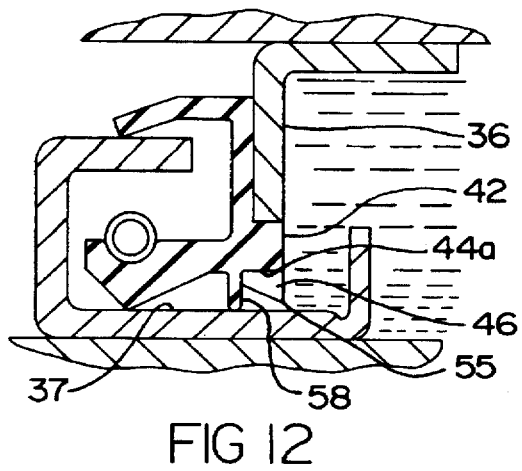
FIG 12

HYDRODYNAMIC LOW-TORQUE LUBRICANT SEAL WITH PUMPING PROJECTIONS

BACKGROUND OF THE INVENTION

1. Field of the Invention

This invention relates in general to a radial lip shaft seal and, more particularly, to a lubricant seal which includes a thin radial lip for static sealing and a series of bidirectional hydrodynamic pumping surfaces for enhancing dynamic sealing.

2. Description of Prior Developments

Annular sealing elements provided with pumping surfaces for pumping lubricant toward the lubricant side of the sealing element are well known. These pumping surfaces or pumping elements pump lubricant back toward the lubricant supply, thereby helping to prevent the lubricant from escaping.

The pumping surfaces require relative rotation of the lubricant and the pumping surfaces in order for the pumping surfaces to exert any pumping action on the lubricant. The sealing action provided by such pumping surfaces is sometimes referred to as a hydrodynamic effect.

Typically, sealing assemblies having hydrodynamic sealing capabilities also include static seals in order to provide the necessary sealing action when a rotary member is at rest or motionless. When the rotary member is rotating, the sealing effect is achieved by the combination of lubricant pumping surfaces and the static seal.

Referring to the prior art, U.S. Pat. No. 3,497,225 ('225) shows a sealing assembly that includes a static seal surface together with triangular land areas located on the air side of the static seal. The land areas exert a pumping action on any lubricant that leaks past the static seal. One drawback of this arrangement is that the pumping action of the land areas has to overcome the sealing action of the static seal before it can return lubricant to its original location in the bearing. Additionally, the facial engagement of the land areas on the rotating shaft surface is relatively great so that frictional heat generation and frictional power losses can be significant.

U.S. Pat. No. 3,807,743 ('743) discloses a static seal surface 32 and a series of lubricant pumping elements located on the air side of the static seal. As in the case of the '225 patent, the pumping elements are located on the air side of the static seal which can be a disadvantage.

Another patent showing pumping elements on the air side of the static seal is U.S. Pat. No. 3,921,987 ('987). In the '987 patent, triangular pumping ridges are formed along the downstream face of a sealing lip. Ridges are intended to pump any leakage lubricant reversely back across the sealing lip onto the lubricant side of the seal interface.

U.S. Pat. No. 4,770,548 ('548) shows a hydrodynamic seal that includes a primary lip and a secondary lip. The primary lip has a series of lubricant pumping cavities on the lubricant contact surface so that, when the shaft is rotating, lubricant is pumped back into the bearing. The secondary lip is primarily for the purpose of preventing external contaminants from entering the bearing through the hydrodynamic seal.

The primary lip is relatively thick in the axial direction in order to accommodate pumping cavities. It is necessary therefore to provide a clearance between the lip and the bearing surface in order to avoid excessively high frictional forces that would otherwise be associated with the axially thickened lip edge. The clearance is disadvantageous in that it spaces the pumping surfaces away from the sealing surface. There is a possibility that some lubricant on the sealing surface can escape the action of the pumping surfaces and migrate along the sealing surface to exert a hydrodynamic pressure on the lip. Should this happen, the value of the pumping cavities will be lessened to some degree.

SUMMARY OF THE INVENTION

The present invention provides a hydrodynamic seal having an elastomeric sealing element with a frustoconical front surface facing the lubricant side of the seal. Pumping elements take the form of circumferentially spaced projections on the frustoconical front surface of the sealing element.

Each projection has a front surface that is generally flat in the radial direction and arcuately convex in the axial direction. Each projection also has a rear surface that extends forwardly from the sealing element front surface at an acute angle to the projection front surface. The intersection of the front and rear surfaces of the projection forms a sharp leading edge that has minimal surface area.

The angulation of the rear surface on each projection enables the leading edge of the projection to be relatively close to the surface of a rotating member such as a shaft, thereby enabling the projection to exert a pumping action on lubricant in the immediate vicinity of the rotating surface. The close clearance between the projection leading edges and rotating shaft produces a more effective pumping action with less tendency of the lubricant to migrate along the rotating member surface to exert undesired pressure on the static sealing element.

The close clearance between the projections and the surface of the rotating member is possible because the projection rear surface is acutely angled to the projection front surface. The inner surface area of the projection has potential engagement with the rotating member only along the thin leading edge of the projection. This relatively thin leading edge can be positioned relatively close to the rotating member surface without generating undesired frictional forces between the seal and rotating shaft member since little if any amount of elastomeric lip material will be deformed by contact with the shaft. The less deformation or displacement of the elastomeric leading edge, the less drag is applied to the shaft and the less torque is required to rotate the bearing or shaft being sealed.

The inner leading edge of the projection can be spaced a nominal distance, e.g., approximately 0.010 inch, from the rotating shaft surface, or even in direct contact with the rotating shaft surface, without generating undesired frictional forces. This is advantageous from a manufacturing standpoint since there is less concern for maintaining excessively close tolerance values on the molded elastomer surfaces. Cost of manufacture can be reduced. The particular shape of the projections is easy to manufacture with a simple rotating cutting tool forming the required cavities in a seal mold.

The invention may be further advantageous in that the pumping elements are formed as projections on the front surface of the elastomeric sealing element. The pumping projections are exposed to and in the direct escape path that lubricant would have to take in order to pass across the static sealing lip. Accordingly, it is difficult for lubricant in the vicinity of the sealing element interface to bypass the pumping elements.

With the arrangement proposed in the aforementioned '548 patent, the pumping elements take the form of cavities in a radial face of the sealing element. When grease or analogous high viscosity flowable material is used as the lubricant, lubricant can flow along the rotating member surface without going into the pumping cavities due to the large radial clearance between the shaft and the cavities required to prevent the drag of a large axial section of elastomeric material along the shaft. The use of thin projections as pumping elements, as herein proposed, is believed to have advantages over pumping cavities as disclosed in the '548 patent.

The aforementioned objects, features and advantages of the invention will, in part, be pointed out with particularity and will, in part, become obvious from the following more detailed description of the invention, taken in conjunction with the accompanying drawings, which form an integral part thereof.

BRIEF DESCRIPTION OF THE DRAWINGS

In the Drawings:

FIG. 1 is a fragmentary cross sectional view taken through an antifriction bearing having a lubricant seal of the present invention installed thereon;

FIG. 2 is an enlarged sectional view taken in the same direction as FIG. 1, and showing an operating portion of the lubricant seal;

FIG. 3 is a front or axial view of the FIG. 2 construction taken in the direction of arrow 3, but rotated slightly to show certain features of the seal;

FIG. 4 is a fragmentary view of the FIG. 2 construction taken in the direction of arrow 4 in FIGS. 2 and 3;

FIG. 5 is a fragmentary view taken in the same direction as FIG. 4 but showing an alternate form of the invention; and FIGS. 6, 7 and 8 are fragmentary sectional views taken in the same direction as FIG. 2 but illustrating other forms and configurations that the invention can take;

FIG. 9 is a view taken in the same direction as FIG. 8, but showing a variant of the FIG. 8 configuration;

FIG. 10 is a fragmentary sectional view taken on line 10—10 in FIG. 9;

FIG. 11 is a fragmentary sectional view taken on line 11—11 in FIG. 9; and

FIG. 12 is a sectional view taken in the same direction as FIG. 9, but showing a further form that the invention can take.

In the various figures of the drawings, like reference characters designate like parts.

DETAILED DESCRIPTION OF THE PREFERRED EMBODIMENTS

FIG. 1 is a fragmentary cross sectional view taken through an antifriction bearing having a lubricant seal of the present invention installed thereon. The bearing includes an inner race member 8 secured to a non-illustrated rotary shaft, such that the race member is adapted to rotate with the shaft around a horizontal shaft axis. Member 8 provides an annular raceway 10 for a plurality of antifriction rollers 16 that are spaced apart by a cage structure 20. Insofar as the present invention is concerned, the antifriction bearing elements could be balls rather than rollers.

Each roller 16 is in rolling contact with an outer raceway 4 formed by an outer annular housing 2. The rollers may be lubricated by a viscous flowable lubricant, such as heavy oil or grease, substantially filling the chamber 22 in which the rollers are located. FIG. 1 shows one end portion of the bearing assembly. In practice, the bearing assembly includes a double row of tapered roller bearings. The second row (not shown) is a mirror image of the roller bearing arrangement depicted in FIG. 1.

Each end of the antifriction bearing assembly is sealed by a lubricant seal of the type shown at 30 in FIG. 1, i.e. the lubricant seal 30 is duplicated at the non-illustrated end of the bearing, such that the viscous lubricant is sealed within chamber 22. The present invention is primarily concerned with the construction and operation of lubricant seal 30.

The illustrated seal 30 includes an inner annular casing 32 having a press fit on inner race member 8, and an outer annular casing 34 having a press fit on or in housing 2. Annular casing 32 provides a cylindrical sealing surface 37 concentric with the shaft rotational axis. Outer casing 34 includes a radial support wall 36 around which an annular elastomeric sealing element 38 is molded. Sealing element 38 has one or more static sealing lips in continuous sliding contact with cylindrical surface 37 to prevent viscous lubricant from escaping out of lubricant chamber 22.

Sealing element 38 includes an annular front surface 40 facing the lubricant side of the interface formed by the two casings 32 and 34. Front surface 40 includes an outer annular surface area 42 extending in a radial plane, and an inner annular surface area 44 extending obliquely relative to surface area 42. Front surface 44 is a frustoconical surface angled to radial surface 42 at about sixty-five degrees. The exact angle is not critical.

Extending forwardly from front surface 40 are a number of lubricant pumping projections 46. FIG. 2 shows one of the projections in side elevation. FIG. 3 shows one of the projections viewed in an axial direction. FIG. 4 shows the projection viewed in a radial direction. There are preferably a series of pumping projections 46 spaced around the circumference of sealing element 38. Typically, there may be about twenty-four such projections, although the number is not critical to practice of the invention. The circumferential spacing of the projections is preferably somewhat less than the length of each individual projection in order to reduce the lubricant pumping requirements for each projection.

Each projection 46 has a front surface 47 facing the lubricant and a rear surface 48 facing the air side of the seal interface. As shown in FIG. 4, the front surface 47 is generally arcuate in the radial plane. Surface 47, which may take the shape of a segment of a circle, includes two angularly-related or curved intersecting faces 49,51 merging together to form a central protruding nose area 53. Face 49 acts as a lubricant pumping surface when the shaft is rotating in one direction. Face 51 acts as a lubricant pumping surface when the shaft is rotating in the opposite direction.

Inner casing 32 rotates with the shaft to pull some of the viscous lubricant along the front surface of the sealing element 38. As the lubricant contacts one of the angulated or curved faces 49,51, it is deflected away from the sealing element front surface. The cumulative actions of the various pumping projections 46 is to produce a pumping affect on the lubricant in a direction away from the air side of the sealing element interface and toward the lubricant side of the interface, i.e. rightwardly in FIGS. 1 and 2.

In most cases, the elastomeric sealing element will be stationary while the inner casing or shaft 32 will be rotating. However, the invention can also be used in an environment in which the shaft is stationary and the surrounding housing is rotating. In either event, the lubricant pumping action results from relative rotational movement between the elastomeric sealing element and the body of lubricant in the sealed lubricant chamber.

The front surface of each projection 46 is arcuate in the circumferential plane as shown in FIG. 4, and flat in the radial direction. The flat surface contour is most apparent in FIG. 2. With such a flat surface contour, each projection tends to move the contacted lubricant in a generally axial direction away from front surface 40 of the sealing element.

The rear surface 48 of each projection extends forwardly from the inner edge of sealing element front surface 44 at an acute angle A to a radial plane B containing the nose surface 53. Angle A is typically about sixty or sixty-five degrees but, in any event, less than ninety degrees. Rear surface 48 intersects the front surface 47 of the projection at an acute angle to form a sharp wedge-like leading edge 55 and rear surface 48 diverges axially and radially away from nose surface 53 towards the air side of the seal.

As shown in FIG. 3, the sharp leading edge 55 is relatively close to the cylindrical sealing surface 37 on casing 32 in the vicinity of nose area 53. At the ends of the projection 46, the sharp edge 55 is spaced further away from surface 37. This spacing is advantageous in that a relatively small radial clearance can be used between edge 55 and surface 37 without producing excessive frictional contact between the pumping projections and surface 37. This is due to the fact that each projection has potential contact with surface 37 only at the nose area 53 of the projection. Also, the sixty degree angulation A between rear surface 48 of the projection and the front surface 47 of the projection is such that leading edge 55 is a narrow edge having a relatively small width as viewed in FIG. 2.

The construction of each projection 46 is such that the leading edge 55 of the projection can be relatively close to surface 37 at the nose area 53 so that the projection can exert a pumping action on lubricant proximate to surface 37. The lubricant has minimal tendency to escape the pumping action by flowing along surface 37 toward the air side of the sealing element interface. The nominal radial clearance between edge 55 and cylindrical surface 37 will be typically no more than about 0.01 or 0.02 inch at the nose area 53. Assuming normal manufacturing tolerances, the edge 55 may, in some instances, come into limited contact with surface 37 without adverse impact on performance or service life.

Referring for the moment to FIG. 8, the leading edge 55 of the projection is shown in contact with surface 37 at the nose area of the projection. The narrow edge contact area is limited, such that the contacting area of the elastomer can wear during service to achieve a close clearance relationship with surface 37. Projections 46 are designed to have a minimal localized clearance with surface 37 so as to achieve a good pumping action on lubricant proximate to surface 37.

The acute angulation A between surfaces 47 and 48 ensures that each projection 46 will have potential contact with cylindrical surface 37 only at the nose area 53. This advantageously minimizes the effect that manufacturing tolerances can have on pumping performance and frictional losses.

U.S. Pat. No. 5,511,886 shows a molded seal construction having lubricant pumping projections somewhat similar to the projections depicted in FIGS. 2 through 5. However, each projection in U.S. Pat. No. 5,511,886 has an undersurface 74 that parallels the associated cylindrical wear surface 58, such that undersurfaces 74 can frictionally engage surface 58 or be spaced excessive distances from surface 58, depending on the direction that manufacturing tolerances might take.

The sealing element shown in FIGS. 1 through 4 of the present disclosure comprises a deflectable annular static sealing lip 58 located in a radial plane proximate to the sealing element front surface. Lip 58 includes two parallel radial faces 59,60 and a narrow edge 61 connecting the radial faces. Edge 61 can have a semi-circular, cross sectional profile so as to have essentially line contact with cylindrical surface 37.

Typically, the static sealing lip 58 will have a radial dimension of about 0.10 inch and an axial thickness dimension of about 0.02 inch. The sealing lip is dimensioned so as to be easily deflectable about its connection with the main body of the sealing element. Such low force deflection is desirable in order to enable the lip to vent high pressures generated in lubricant chamber 22 under certain conditions, principally excessively high temperature conditions of limited duration.

Lip 58 forms a low force, static seal having narrow edge contact with cylindrical surface 37. When the shaft is motionless, the lubricant pressure on lip 58 is minimal so that the lip is able to contain the lubricant against flow across the sealing element interface even with a low radial sealing force. When the shaft is rotating, the pumping elements or projections 46 pump lubricant back into chamber 22, i.e. away from lip 58, such that the lubricant pressure on face 59 of the lip is relatively low. The static sealing lip 58 can therefore provide the desired sealing action even though it is readily deflectable for venting high pressures generated at isolated times in chamber 22.

The sealing element shown in FIG. 1 includes two dust sealing lips 64,66 configured to have narrow edge contact with casing 32. Lips 64,66 are designed to have a relatively low pressure engagement with casing 32 so as to achieve the dirt shielding action without offering significant resistance to the venting of high pressures generated in chamber 22 as well as to reduce drag. Lips 64,66 can have a slight clearance relative to casing 32 while still achieving the dirt-shield action, i.e. preventing ambient moisture or contaminants from getting into the seal.

As shown in FIG. 5, the pumping surfaces 49,51 can be flat rather than arcuate as in FIG. 4. The flat pumping surfaces perform in essentially the same fashion as the arcuate faces shown in FIG. 4.

The sealing element assembly shown in FIG. 1 is a unitized seal assembly, wherein the inner and outer casings 32,34 are interlocked for installation as a single unit. FIGS. 6 and 7 show other forms of the invention wherein only one casing is used. As shown in FIG. 6, the sealing assembly includes a single casing 34 and an elastomeric sealing element molded to casing 34 homogeneously with the pumping projections 46 and the static sealing lip 58. The FIG. 6 assembly does not have a dust seal. Sealing lip 58 can seal against a cylindrical shaft surface 37.

FIG. 7 is similar to FIG. 6, except that the static seal includes a spring-biased cantilever sealing lip 68 in lieu of the radial sealing lip 58 shown in FIGS. 2 and 6. Lip 68 serves as a combination static seal and dust shield.

FIG. 8 shows a unitized seal assembly that is, in most respects, similar to the assembly shown in FIG. 1. One distinguishing feature is that the outer surface area 42 of the sealing element front surface projects forwardly beyond the leading edge of the inner angled surface area 44. This does not affect the pumping action. The pumping projections 46 are still enabled to perform the desired pumping action on any lubricant in contact with the pumping projections.

In the FIG. 8 sealing assembly, the static seal is provided by an annular cantilever sealing lip 70 having narrow edge contact with the inner casing 32. Flap 70 performs in the same manner as flap 68 in FIG. 7.

FIG. 9 shows a sealing element assembly that is similar to the FIG. 1 assembly, except for the contour on the sealing element front surface, i.e. the surface facing the liquid side of the seal interface. In FIG. 9, the sealing element front surface comprises an annular radial surface area 42 and a circumferential surface area 44a extending parallel to sealing surface 37. Operationally, the FIG. 9 construction is similar to the FIG. 1 construction. In both cases, the viscous lubricant is pumped generally axially away from the sealing element front surface.

FIG. 12 shows a variant of the FIG. 9 arrangement wherein annular radial surface area 42 is located in the same radial plane as the front surface of radial support wall 36. Operationally, the FIG. 12 sealing element assembly performs in essentially the same fashion as the earlier described embodiments of the invention.

The invention is characterized by two related features. In each of the illustrated invention embodiments, the lubricant pumping projections have rear surfaces 48 that are acutely angled to the respective front surfaces 47. This is advantageous in that the sharpened edge 55 of each projection can be relatively close to sealing surface 37 without causing the associated surface 48 to have undesired frictional engagement on surface 37. With edge 55 of each pumping projection in close proximity to sealing surface 37, the projection can pump lubricant located on or near surface 37. The viscous lubricant cannot easily bypass the pumping elements by migrating along surface 37. The acute angulation A of surface 48 compensates for manufacturing tolerances in that the design clearance between edge 55 and sealing surface 37 can be set at a relatively small value without danger that, in any particular instance, surfaces 48 will have excessive frictional drag on sealing surface 37.

A further feature of interest is the construction of static sealing lip 58. The lip radial dimension is appreciably greater than the lip axial thickness, e.g., 0.10 inch versus 0.02 inch, whereby the static sealing lip is readily deflectable. This is advantageous in that the lip is enabled to vent pressures generated in lubricant chamber 22 under certain conditions, e.g., temperature situations of limited duration.

Obviously, numerous modifications and variations of the present invention are possible in the light of the above teachings. It is therefore to be understood that within the scope of the appended claims, the invention may be practiced otherwise than as specifically described herein. The invention is concerned primarily with the combination of a thin static seal with pumping projections 46, especially the angulation of the projection rear surface 48 whereby the projection can have a relatively small radial clearance with respect to the associated cylindrical surface 37, whereby the projection is enabled to exert a pumping action on lubricant proximate to surface 37.

What is claimed is:

1. A lubricant seal assembly for an interface between an annular housing and a relatively rotatable member extending within said housing wherein said interface has a lubricant side and an air side, said relatively rotatable member having a cylindrical sealing surface concentric with its rotational axis, said lubricant seal assembly comprising:

an annular casing mountable on said annular housing, said casing comprising a sealing element support wall spaced from the cylindrical surface of the rotary member;

an annular elastomeric sealing element molded onto said support wall, said sealing element having an annular front surface on the lubricant side of the interface in outwardly spaced relation to said cylindrical surface;

a plurality of circumferentially spaced, lubricant pumping projections on said annular front surface, each said projection having a front surface adapted to face the lubricant side of the interface, and a rear surface adapted to face the air side of the interface;

each projection front surface comprising two angularly related lubricant pumping faces acutely angled to a radial plane to form a central protruding nose area;

each projection rear surface extending forwardly from the annular front surface of the sealing element at an acute angle to said radial plane;

each acutely angled rear surface intersecting the associated front surface of the respective projection to form a sharp leading edge;

each said leading edge having a minimal spacing from the cylindrical surface of the relatively rotatable member along the protruding nose area of the projection, such that said projections exert minimal drag forces on the rotary member while at the same time being effective for pumping lubricant away from the annular front surface of the sealing element at locations proximate to the cylindrical surface of the relatively rotatable member.

2. The lubricant seal of claim 1, wherein the front surface on each projection is arcuate in the circumferential plane.

3. The lubricant seal of claim 1, wherein the rear surface of each projection is angled to the associated projection front surface at an angle of approximately sixty degrees.

4. The lubricant seal of claim 1, wherein the front surface of each projection is arcuate in the circumferential direction and flat in the radial direction.

5. The lubricant seal of claim 1, wherein the front surface of said sealing element comprises a frustoconical surface area.

6. The lubricant seal of claim 1, wherein said annular sealing element comprises a deflectable sealing lip having narrow edge contact with the cylindrical surface of the rotary member, said deflectable sealing lip being located on the air side of said projections.

7. The lubricant seal of claim 6, wherein said deflectable sealing lip has two parallel radial faces and a narrow edge connecting said radial faces.

8. The lubricant seal of claim 7, wherein the radial dimension of said deflectable sealing lip is appreciably greater than the axial thickness of said lip, such that the sealing lip is readily deflectable.

9. The lubricant seal of claim 7, wherein said deflectable sealing lip is located in a radial plane proximate to the annular front surface of the sealing element.

10. The lubricant seal of claim 1, wherein the front surface of said sealing element comprises a frustoconical surface area, said sealing element comprising a deflectable radial sealing lip having narrow edge contact with the cylindrical surface of the rotary member in a plane proximate to the sealing element front surface, said radial sealing lip being located on the air side of said lubricant pumping projections.

11. The lubricant seal of claim 10, wherein said sealing lip comprises two parallel radial faces and a narrow annular edge connecting said radial faces.

12. The lubricant seal of claim 1, wherein the front surface of said sealing element comprises a circumferential surface spaced radially outwardly from and parallel to the cylindrical sealing surface on said relatively rotatable member; each lubricant pumping projection extending radially inwardly from the sealing element cylindrical surface.

13. The lubricant seal of claim 12, wherein said annular sealing element comprises a deflectable radial sealing lip extending radially inwardly on the air side of the lubricant pumping projections.

14. The lubricant seal of claim 13, wherein said sealing lip comprises two parallel radial faces and a narrow annular edge connecting said radial faces.

15. A seal, comprising:

an annular casing;

a sealing element mounted on said casing, said sealing element comprising a lubricant side portion, an air side portion and an annular sealing lip disposed therebetween; and a plurality of circumferentially-spaced lubricant pumping projections provided on said lubricant side portion of said sealing element, said projections respectively having a front surface facing away from said sealing lip and a rear surface facing toward said sealing lip, said front surface including a pair of pumping faces forming an axially protruding nose portion extending axially away from said sealing lip, said front surface intersecting and forming an acute angle with said rear surface so as to define a wedge-shaped leading edge portion and said rear surface diverging axially and radially away from said nose portion toward said air side portion.

* * * * *